(12) United States Patent
Elsner et al.

(10) Patent No.: US 6,545,122 B1
(45) Date of Patent: Apr. 8, 2003

(54) METHOD AND DEVICE FOR EVAPORATING POLYMER SOLUTIONS OF THERMOPLASTIC POLYMERS, AND A POLYCARBONATE WHICH CAN BE OBTAINED BY EVAPORATION

(75) Inventors: Thomas Elsner, Düsseldorf (DE); Jürgen Heuser, Krefeld (DE); Christian Kords, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/019,352

(22) PCT Filed: Apr. 11, 2000

(86) PCT No.: PCT/EP00/03216

§ 371 (c)(1),
(2), (4) Date: Oct. 19, 2001

(87) PCT Pub. No.: WO00/64554

PCT Pub. Date: Nov. 2, 2000

(30) Foreign Application Priority Data

Apr. 24, 1999 (DE) .......................... 199 18 728

(51) Int. Cl.⁷ .................................................. C08J 3/00
(52) U.S. Cl. ........................................................ 528/503
(58) Field of Search .......................................... 528/503

(56) References Cited

U.S. PATENT DOCUMENTS 5,256,707 A    10/1993   Casper et al. ................ 523/318

FOREIGN PATENT DOCUMENTS

| EP | 0 150 225 | 12/1987 |
|----|-----------|---------|
| EP | 0 334 314 | 9/1989  |
| EP | 0 352 727 | 1/1990  |
| EP | 0 723 029 | 4/1996  |
| EP | 0 709 421 | 5/1996  |

*Primary Examiner*—Terressa M. Boykin
(74) *Attorney, Agent, or Firm*—Joseph C. Gil; James R. Franks

(57) ABSTRACT

Described is a multi-stage, continuous process for evaporating and concentrating feed polymer solutions. In a first stage (a) of the process, the feed polymer solution is concentrated by passing it through one of (i) a combination of a tubular heat exchanger with one of a thin-film evaporator and a coiled tube evaporator, and (ii) a tubular heat exchanger. Each evaporator of (i) having a downstream separator. In a further stage (b), the intermediate polymer solution of the first stage is further concentrated and degassed to form a product polymer in a tubular heat exchanger having a downstream separator. The tubular heat exchanger of the further stage has an inside diameter of from 5 to 30 mm, and a length of from 0.5 to 4 m, and the throughput per heat exchanger tube being from 5 to 30 kg/h, based on the polymer. An entrainer is introduced into a delivery device located downstream from the separator of further stage (b). The product concentrated/degassed polymer of further stage (b) is then isolated and optionally granulated. Also described is an apparatus for evaporating and concentrating feed polymer solutions.

15 Claims, 1 Drawing Sheet

METHOD AND DEVICE FOR EVAPORATING POLYMER SOLUTIONS OF THERMOPLASTIC POLYMERS, AND A POLYCARBONATE WHICH CAN BE OBTAINED BY EVAPORATION

CROSS REFERENCE TO RELATED PATENT APPLICATIONS

The present patent application claims the right of priority under 35 U.S.C. §119 (a)–(d) and 35 U.S.C. §365 of International Application No. PCT/EP00/03216, filed Apr. 11, 2000, which was published in German as International Patent Publication No. WO 00/64554 on Nov. 2, 2000, which is entitled to the right of priority of German Patent Application No. 199 18 728.2, filed Apr. 24, 1999.

FIELD OF THE INVENTION

The invention relates to a multi-stage, continuous process for evaporating polymer solutions, especially of thermoplastic polymers, by indirect heat exchange by passing the polymer solution through heat exchangers, especially tubular heat exchangers, having a downstream separator, and to an apparatus for carrying out that process. The invention relates also to polycarbonate treated by the process according to the invention having a residual bisphenol A content of <5 ppm.

BACKGROUND OF THE INVENTION

The removal of volatile components from a polymer solution is one of the last process steps in the preparation of many polymers. The volatile constituents to be removed may be either solvents and/or unpolymerised monomers. Depending on the order of magnitude of the viscosity of the polymer solution, different variants are known for removing the volatile components from the polymer solution; in each of those variants, the polymer solution is heated above the evaporation temperature of the volatile constituents. There are known as apparatuses, for example, thin-film evaporators, extruders and those having indirect heat exchange.

When heating the polymer solution it is crucial that the polymer should not be damaged thermally. Thermal damage causes undesirable colour changes or the presence of pinholes in the polymer.

EP-A-0 150 225, for example, describes an apparatus having two heat exchanger bundles connected in series. The heat exchanger bundles have rectangular channels disposed horizontally, in which the polymer solution is degassed. The apparatus is used mainly for the two-stage heating or cooling of viscous polymer solutions during the reaction, but its manufacture and operation are relatively complex.

EP-A1-0 451 602 discloses a process for concentrating polymer solutions, in which the preheated solution is, in a throttled manner, expanded into a helical flow tube and the concentrated solution is concentrated further in a second drying apparatus having self-cleaning elements which is located immediately downstream. The process has the disadvantage that the final concentration of solvent in the polymer is still comparatively high, and that the dwell time in the downstream drying apparatus is too long. Polymer particles are able to collect on the inner walls of the helical tube, reducing the quality of the product.

SUMMARY OF THE INVENTION

The object of this invention is, therefore, to make available a process and an apparatus for removing volatile components from a polymer solution, which process and apparatus do not exhibit the disadvantages of the processes known from the prior art.

That object could be achieved with the elaboration and provision of the process according to the invention, which is described in greater detail below. In addition, that object could be achieved with the elaboration and provision of the apparatuses according to the invention, which are described in greater detail below. In addition, that object could be achieved with the elaboration and provision of the polycarbonate according to the invention which has been treated by the process according to the invention and is described in greater detail below.

The invention provides a multi-stage, continuous process for evaporating polymer solutions, especially of thermoplastic polymers, by indirect heat exchange by passing the polymer solution through heat exchangers, especially tubular heat exchangers, having a downstream separator, characterised in that a) first, in a single stage or in a plurality of individual stages, the polymer solution having a polymer content of from 5 to 20 wt. % is concentrated to from 60 to 75 wt. % in a combination of a tubular heat exchanger and a thin-film evaporator, or a coiled tube evaporator or in a tubular heat exchanger, each having a downstream separator, at a temperature of from 100 to 250° C., the pressure in the separator being approximately from 0.1 to 0.4 MPa, b) in a further stage, the polymer solution is concentrated from 60 to 75 wt. % to at least 95 wt. %, especially to more than 98 wt. %, in a tubular heat exchanger having a downstream separator, at a temperature of from 130 to 350° C., the tubular heat exchanger having vertical, heated, straight tubes, with or without built-in static mixers, having an inside diameter of from 5 to 30 mm, preferably from 5 to 15 mm, and a length of from 0.5 to 4 m, preferably from 1 to 2 m, and the throughput per heat exchanger tube through the tubes being from 5 to 30 kg/h, preferably from 15 to 25 kg/h, based on the polymer, the pressure in the separator being from 3 kPa to 0.1 MPa, preferably from 5 kPa to 0.1 MPa, and an entrainer, especially carrier gas, being introduced into the delivery device located downstream of the separator, at the intake side, and c) the degassed polymer is subsequently isolated and, optionally, granulated.

Nitrogen ($N_2$) is preferably used as the entrainer. It has been found that, by introducing nitrogen, the residual content of volatile components can be reduced to <500 ppm without the need for further measures in terms of apparatus.

The invention also provides an apparatus for evaporating polymer solutions, especially of thermoplastic polymers, by indirect heat exchange by passing the polymer solution through heat exchangers, especially tubular heat exchangers, having a downstream separator, characterised in that a) the first stage or stages has or have a tubular heat exchanger and/or coiled tube evaporator (3) each having a downstream separator (4), b) the further stage has a tubular heat exchanger (7) having a downstream separator (8), the tubular heat exchanger (7) having vertical, heated, straight tubes having an inside diameter of from 5 to 30 mm, preferably from 5 to 15 mm, and a length of from 0.5 to 4 m, preferably from 1 to 2 m, and c) there is arranged downstream of each stage a delivery device (6, 9) for transporting the polymer solution, an entrainer, especially carrier gas, being introduced at the intake side of the delivery device of the further stage.

The invention also provides a polycarbonate treated by the process according to the invention, characterised by a residual bisphenol A (BPA) content of less than 5 ppm.

DETAILED DESCRIPTION OF THE INVENTION

Figure 1:
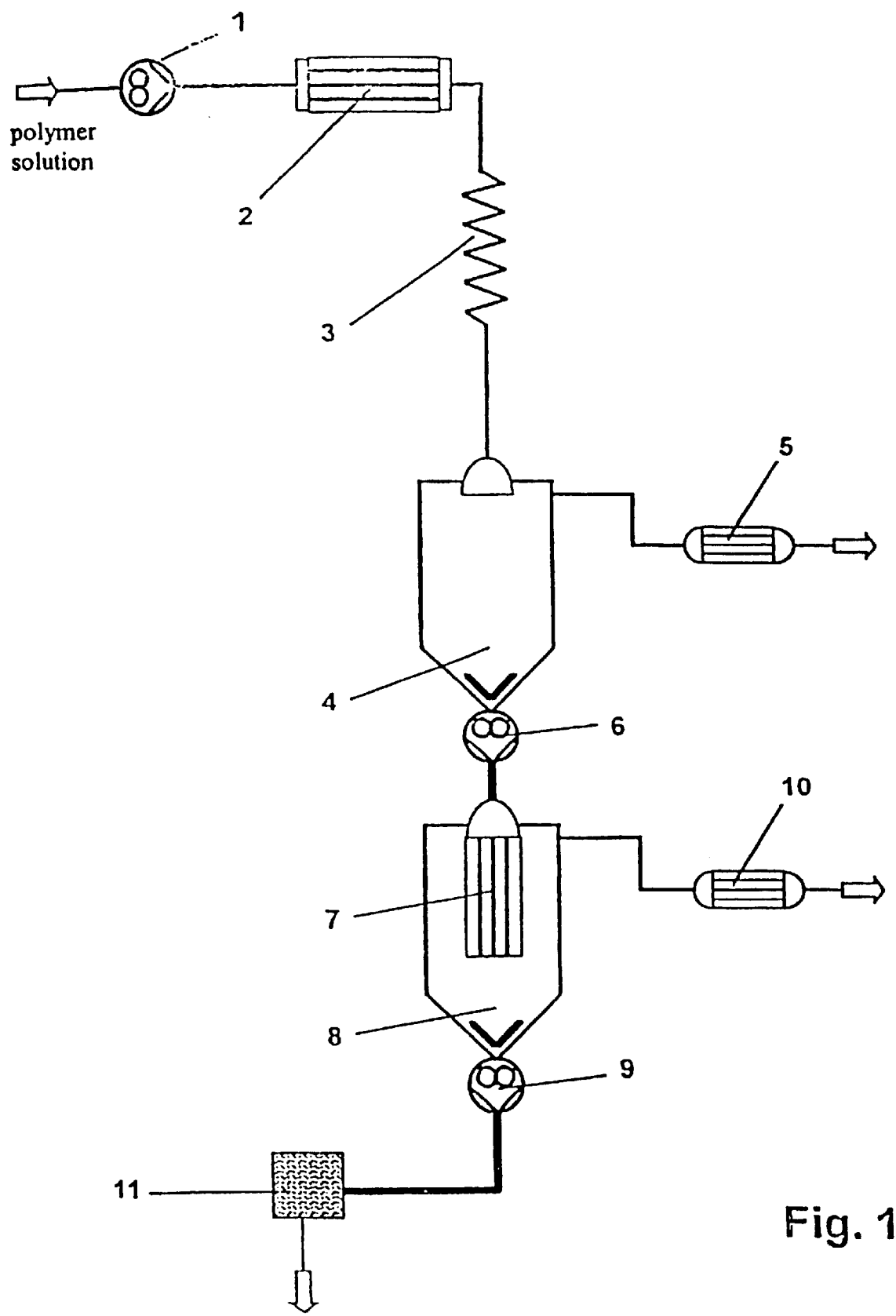
FIG. 1 is a schematic representation of an apparatus according to the present invention.

The process according to the invention can be used for removing volatile components from solutions of any desired liquid or meltable polymers and similar substances.

The volatile components, in addition to the solvent, may be both unpolymerised monomers or oligomers and other low molecular weight starting materials. A solvent that is frequently used in the preparation of thermoplastic polymers, especially polycarbonate, is methylene chloride or a mixture of methylene chloride and chlorobenzene.

Preferably, however, the process according to the invention is used for degassing thermoplastic polymers. Those polymers include all plastics that become flowable under the effect of pressure and temperature. There may be mentioned by way of examples polycarbonate, polystyrene, polyphenylene sulfide, polyurethane, polyamide, polyester, polyacrylate, polymethacrylate, SAN resin and their copolymers. The process is very especially suitable for the installation and drying of polycarbonate solutions.

Polycarbonates which can be processed especially advantageously using the process according to the invention are both homopolycarbonates and copolycarbonates. In a manner known in principle, the polycarbonates may be linear or branched in structure. Up to 80 mol %, preferably from 20 to 50 mol %, of the carbonate groups in the suitable polycarbonates can be replaced by aromatic dicarboxylic acid ester groups. Such polycarbonates, which contain both acid radicals of carbonic acid and acid radicals of aromatic dicarboxylic acids incorporated in the molecule chain, are, to give them their correct name, aromatic polyester carbonates. They are to be subsumed under the generic term thermoplastic aromatic polycarbonates.

There are treated by the process according to the invention especially preferably thermoplastic polycarbonates having an average molecular weight $M_v$ (calculated by measuring the relative viscosity at 25° C. in $CH_2Cl_2$ and at a concentration of 0.5 g per 100 ml of $CH_2Cl_2$) of from 12,000 to 400,000, preferably from 18,000 to 80,000 and especially from 22,000 to 60,000. Very special preference is given to bisphenol A homopolycarbonate having the above-mentioned properties.

The polymer freed of solvent according to the process has a viscosity of especially from 100 to 5000 Pas in the molten state.

A bisphenol A homopolycarbonate treated according to this process has a residual bisphenol A (BPA) content of less than 5 ppm at the melting temperature (320° C.).

The heat exchangers used, especially the tubular heat exchangers, have any desired means known in principle to the person skilled in the art for heating the channels or tubes through which the polymer solution flows to a temperature above the evaporation temperature of the volatile components. Those means are, for example, resistance heaters or a system of pipes for transporting a heat exchanger fluid.

In a further development of the invention, the first stage a) is carried out in a tubular heat exchanger which has heat exchanger tubes for the polymer solution having an inside diameter of from 5 to 30 mm, preferably from 5 to 15 mm, and a length of from 0.5 to 5 m, preferably from 3 to 4 m, the throughput through the heat exchanger tubes per tube being from 5 to 30 kg/h, preferably from 15 to 25 kg/h, based on the polymer.

In an alternative further development of the invention, a gear pump, an entrapment pump or a delivery roller is used as the delivery device. There is preferably proposed the use of a gear pump whose gland or shaft seal is so formed that the carrier gas can be introduced there.

All the parts that come into contact with the polymer solution, especially the heat exchanger or the tubular heat exchangers, can be produced from any desired material. Preferably, however, those parts, especially the heat exchangers, are produced from a low-iron material having an iron content not exceeding 10%. All parts of the heat exchangers that come into contact with the product are produced especially preferably from Alloy 59 (2.4605), Inconell 686 (2.4606), Alloy-B2, Alloy-B3, Alloy B4, Alloy C-22, Alloy-C276, Alloy-C4 or Alloy 625.

The invention is explained in greater detail below by means of a drawing showing a preferred embodiment.

In the single, diagrammatic Figure, a pump 1, for example a gear pump, a centrifugal pump or a screw pump, feeds the 5 to 20% polymer solution in a first stage through a first tubular heat exchanger 2 and a coiled tube evaporator 3 to the sump of a separator 4. In the separator 4, the more readily volatile components are separated off and condensed in a condenser 5.

In the examplary embodiment shown, and in that respect preferred, a gear pump 6 feeds the already concentrated polymer solution (from 25 to 40 wt. % polymer) through a further tubular heat exchanger and a further coiled tube evaporator to a further separator 8, where the more readily volatile components are separated off and condensed in a condenser 10. The solution, which is now concentrated to from 60 to 85 wt. % polymer, is then fed by a gear pump 9 through a second tubular heat exchanger to the sump of a separator 11.

In order further to concentrate the polymer solution, which has been concentrated to more than 98 wt. %, to a content of volatile constituents of <500 ppm, nitrogen is introduced as carrier gas into the intake side of a further gear pump, as a result of which the desired purity of the polymer solution is achieved.

The more readily volatile components formed in the sump 11 and the gear pump are condensed in a condenser. The polymer melt degassed according to the invention is conveyed from the gear pump to a granulating device.

By means of the described process it is possible when treating bisphenol A homo-polycarbonate at a melting temperature of <320° C. to achieve a residual BPA content of 2 ppm, at all events <5 ppm. Gas chromatography was used as the analysis method for the BPA determination.

What is claimed is:

1. A multi-stage, continuous process for evaporating a feed polymer solution by indirect heat exchange by passing the feed polymer solution through a series of heat exchangers each having a downstream separator, said process comprising:

a) concentrating, at a temperature of from 100 to 250° C., in at least a single stage, the feed polymer solution having a polymer content of from 5 to 20 wt. %, to form an intermediate polymer solution having a polymer content of from 60 to 75 wt. %, in one of (i) a combination of a tubular heat exchanger with one of a thin-film evaporator and a coiled tube evaporator, and (ii) a tubular heat exchanger, each evaporator having a downstream separator, the pressure of each separator being from 0.1 to 0.4 MPa;

b) concentrating and degassing in a further stage, the intermediate polymer solution of step (a) to form a product polymer having a polymer content of at least 95 wt. %, in a tubular heat exchanger having a downstream separator, at a temperature of from 130 to 350° C., the tubular heat exchanger having vertical, heated, straight tubes, optionally with built-in static mixers, having an inside diameter of from 5 to 30 mm, and a length of from 0.5 to 4 m, the throughput per heat exchanger tube being from 5 to 30 kg/h, based on the polymer, the pressure in the separator being from 3 kPa to 0.1 MPa, an entrainer being introduced into a delivery device located downstream of the separator, at the intake side; and c) isolating and optionally granulating said product polymer of step (b).

2. The process of claim 1 wherein said entrainer is nitrogen gas.

3. The process of claim 1 wherein the polymer of said feed polymer solution is a thermoplastic polymer selected from at least one of polycarbonate, polystyrene, polyphenylene sulfide, polyurethane, polyamide, polyester, polyacrylate, polymethacrylate and a SAN resin.

4. The process of claim 3 wherein said polymer is a polycarbonate.

5. The process of claim 1 wherein said feed polymer solution comprises a solvent selected from at least one of methylene chloride and chlorobenzene.

6. An apparatus for evaporating a feed polymer solution by indirect heat exchange by passing the feed polymer solution through heat exchangers having a downstream separator, said apparatus comprising:

a) a first stage comprising at least one of a tubular heat exchanger and a downstream coiled tube evaporator, each having a downstream separator;

b) a further stage comprising a tubular heat exchanger and a downstream separator, the tubular heat exchanger having vertical, heated, straight tubes having an inside diameter of from 5 to 30 mm, and a length of from 0.5 to 4 m; and c) a delivery device for transporting the polymer solution being arranged downstream of each stage, the intake side of the delivery device of said further stage (b) being adapted for the introduction of an entrainer.

7. The apparatus of claim 6 wherein said tubular heat exchanger of said first stage (a) has heat exchanger tubes for the feed polymer solution having an inside diameter of from 5 to 30 mm, and a length of from 0.5 to 5 m, each heat exchanger tube having a throughput of from 5 to 30 kg/h, based on the feed polymer solution.

8. The apparatus of claim 6 wherein said delivery device is a gear pump.

9. The apparatus of claim 6 wherein said delivery device is an entrapment pump.

10. The apparatus of claim 6 wherein said delivery device is a delivery roller.

11. The Apparatus of claim 8 wherein one of a gland and a shaft seal of the gear pump is adapted for the introduction of said entrainer.

12. The apparatus of claim 6 wherein all parts of said apparatus that come into contact with the feed polymer solution and the polymer of the feed polymer solution are fabricated from a low-iron material.

13. The apparatus of claim 12 wherein said low-iron material is selected from Alloy 59 (2.4605), Inconel 686 (2.4606), Alloy-B2, Alloy C-22, Alloy-C276, Alloy-C4, Alloy B2, Alloy B3 and Alloy B4.

14. A product polycarbonate prepared by the process of claim 1, wherein said product polycarbonate has a residual bisphenol A content of less than 5 ppm.

15. A product polycarbonate prepared by the process of claim 1, wherein said product polycarbonate has a residual bisphenol A content of less than 2 ppm.

* * * * *